(12) United States Patent
Sato

(10) Patent No.: US 7,815,379 B2
(45) Date of Patent: Oct. 19, 2010

(54) LENS APPARATUS FOCUS ADJUSTMENT SUPPORT DEVICE AND FOCUS ADJUSTING METHOD

(75) Inventor: Masumi David Sato, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 443 days.

(21) Appl. No.: 11/808,205

(22) Filed: Jun. 7, 2007

(65) Prior Publication Data

US 2007/0292121 A1 Dec. 20, 2007

(30) Foreign Application Priority Data

Jun. 16, 2006 (JP) .......................... P2006-167286

(51) Int. Cl.
*G03B 17/00* (2006.01)
(52) U.S. Cl. ...................... 396/427; 396/103; 348/143; 348/373
(58) Field of Classification Search ......... 396/427–428, 396/448, 534, 131, 419; 348/150–152, 143, 348/373; 359/706
See application file for complete search history.

(56) References Cited

U.S. PATENT DOCUMENTS

| | | | |
|---|---|---|---|
| 3,993,866 A | | 11/1976 | Pearl et al. |
| 4,764,008 A | * | 8/1988 | Wren .......................... 396/427 |
| 5,223,880 A | * | 6/1993 | Rapp ........................... 396/544 |
| D473,888 S | * | 4/2003 | Jones et al. ................ D16/203 |
| 6,683,654 B1 | * | 1/2004 | Haijima ...................... 348/374 |
| 6,788,891 B1 | * | 9/2004 | Mitsugi ....................... 396/144 |
| 7,221,402 B2 | * | 5/2007 | Cheng ......................... 348/375 |
| 7,298,969 B2 | * | 11/2007 | Elberbaum ................... 396/28 |
| 7,385,644 B2 | * | 6/2008 | Tamura ....................... 348/373 |
| 2006/0103755 A1 | | 5/2006 | Costigan et al. |
| 2007/0237517 A1 | * | 10/2007 | Park ........................... 396/427 |

FOREIGN PATENT DOCUMENTS

| | | |
|---|---|---|
| EP | 0 873 010 A1 | 10/1998 |
| JP | 2000-209471 A | 7/2000 |
| JP | 2000-305138 A | 11/2000 |
| JP | 2001-45344 A | 2/2001 |
| JP | 2007-6397 A | 1/2007 |

\* cited by examiner

*Primary Examiner*—W. B. Perkey
*Assistant Examiner*—Linda B Smith
(74) *Attorney, Agent, or Firm*—Birch, Stewart, Kolasch & Birch, LLP

(57) ABSTRACT

The focus adjustment support device is mounted on a lens apparatus included in an image pickup system for supporting the focus adjustment of the lens apparatus. The image pickup system comprises: an image pickup apparatus having a lens apparatus including focus adjusting section requiring a manual adjustment; and, a case member disposed at a given position for covering at least the image pickup range of the lens apparatus and focus adjusting section, while a portion of the case member corresponding to the image pickup range of the lens apparatus is made of a first light transmissible member having a given optical characteristic. The focus adjustment support device includes a second light transmissible member formed to have an optical characteristic which can provide the same image forming position as in a state where the case member is disposed at a given position.

5 Claims, 5 Drawing Sheets

LENS APPARATUS FOCUS ADJUSTMENT SUPPORT DEVICE AND FOCUS ADJUSTING METHOD

BACKGROUND OF THE INVENTION

1. Field of the Invention

The present invention relates to a device for supporting the focus adjustment of a lens apparatus and a method for adjusting the focus of the lens apparatus.

2. Description of the Related Art

Recently, in stores used in the finance business and retail business and the like, there has been often used a surveillance camera which is composed of a CCD or the like. Especially, there has been increasing the need for a dome-type surveillance camera system (which is hereinafter referred simply to as a surveillance camera) which includes a dome-shaped case member for the purpose of not only protecting a lens apparatus but also covering up the image pickup direction thereof.

The structure of this type of surveillance camera is disclosed in JP-2000-305138, JP-2001-45344 and the like. That is, the surveillance camera has a dome-shaped appearance; and, it also includes a base member, a camera apparatus having a lens apparatus to be mounted on the base member, and a light transmissible case member to be mounted on, for example, the base member. The lens apparatus includes a mechanism which can be rotated on the base member in the horizontal direction and/or in the vertical direction. The lens apparatus, which is mounted on this type of surveillance camera, incorporates therein a single focus lens, a variable focus lens and the like. The reason for this is that, according to the surveillance range and installation condition of the lens apparatus, the focus and/or focal distance (zoom) thereof can be set properly. Therefore, the lens apparatus includes adjusting means for manually adjusting the focus and/or focal distance of the lens apparatus and thus, when the surveillance camera is installed, the focus and/or focal distance of the lens apparatus must be adjusted. By the way, the case member is made of plastic material such as acryl having a thickness of the order of several millimeters and is mounted on, for example, the base member in such a manner that it covers at least the image pickup range of the lens apparatus and the adjusting means of the lens apparatus.

A method for installing this type of surveillance camera is disclosed in JP-2000-209471 and the like. Specifically, when installing the surveillance camera, it is installed on the ceiling, wall surface and the like of a store, while the optical axis of the lens apparatus is set in a given direction in the horizontal and/or vertical direction. And, in a state where the case member is not mounted, the focus and/or focal distance of the lens apparatus is manually adjusted using the built-in adjusting means: that is, after the focus and/or focal distance of the lens apparatus is adjusted sufficiently, the case member is mounted onto the surveillance camera and the surveillance camera is installed, which completes the installation of the surveillance camera.

However, in the above-mentioned conventional structure, in some cases, the optical path length of an object light varies between a state where the case member is not mounted on the surveillance camera and a state where the case is mounted on the surveillance camera, thereby causing image forming positions to vary between these two states. When making the focus adjustment again for the purpose of correcting such variation in the image forming position, since the adjusting means provided in the lens apparatus is covered by the case member, it is necessary that the case member is removed from the lens apparatus and, after then, the focus and focal distance of the lens apparatus are manually adjusted. Also, to attain the sufficient focus and focal distance adjustment, in some cases, the manual focus adjustment and the mounting/removal of the case member must be carried out repeatedly several times in a trial-and-error manner. This complicates the focus adjustment of the lens apparatus greatly, which raises a problem that the installation of the surveillance camera itself is difficult.

SUMMARY OF THE INVENTION

The present invention aims at eliminating the above problems. Thus, it is an object of the invention to provide a new and improved focus adjustment support device as well as a new and improved focus adjusting method.

In attaining the above object, according to a first aspect of the invention, there is provided a focus adjustment support device to be mounted onto a lens apparatus included in an image pickup system for supporting focus adjustment of the lens apparatus, the image pickup system comprising: an image pickup apparatus having the lens apparatus including an focus adjusting section requiring a manual adjustment; and a case member disposed at a given position for covering an image pickup range of the lens apparatus and the focus adjusting section, the case member including a portion corresponding to the image pickup range of the lens apparatus, the portion comprising a first light transmissible member having a given optical characteristic, wherein the focus adjustment support device comprises: a second light transmissible member; and a mounting and holding section that holds the second light transmissible member and that mounts the focus adjustment support device onto the lens apparatus in such a manner that a focus of the lens apparatus can be manually adjusted using the focus adjusting section, wherein the second light transmissible member is formed to have an optical characteristic which, in a state where the focus adjustment support device is mounted on the lens apparatus, can provide substantially the same image forming position as in a state where the case member is disposed at the given position.

According to this structure, the second light transmissible member is formed to have an optical characteristic which, in a state where the focus adjustment support device is mounted on the lens apparatus, can provide the same image forming position as in a state where the case member is disposed at the given position. Also, the focus adjustment support device is mounted onto the lens apparatus using the built-in mounting and holding section in such a manner that the focus of the lens apparatus can be manually adjusted using the focus adjusting section. Therefore, when once the focus adjustment support device is mounted on the lens apparatus, although the case member is not disposed, it is possible to provide the same optical condition as in a state where the case member is disposed at the given position. Further, since the focus adjusting section is not covered with the case member or focus adjustment support device, under this optical condition, the focus of the lens apparatus can be adjusted using the focus adjusting section which requires a manual adjustment. Thus, without raising a problem that provision of the case member at the given position causes the image forming position to vary to thereby complicate the focus adjusting operation excessively, the focus of the lens apparatus can be adjusted easily.

Also, the second light transmissible member may have substantially the same index of refraction and thickness as the first light transmissible member and is formed as a portion of a surface constituted by the case member when it is disposed at the given position.

According to this structure, the focus adjustment support device includes the second light transmissible member which has the same index of refraction and thickness as the first light transmissible member and is formed as a portion of a surface constituted by the case member while it is disposed at the given position. Thanks to this, the focus adjustment support device, in a state where it is mounted on the lens apparatus, can provide the same optical condition as in a state where the case member is disposed at the given position.

Also, the mounting and holding portion may also be formed such that a shape of the mounting portion thereof can be changed according to a shape of the portion to be mounted formed in the lens apparatus onto which the focus adjustment support device is to be mounted.

According to this structure, the focus adjustment support device includes the mounting and holding portion formed such that the shape of the mounting portion thereof can be changed according to the shape of the portion to be mounted formed in the lens apparatus onto which the focus adjustment support device is to be mounted. Thanks to this, the focus adjustment support device can be mounted onto different types of lens apparatus as well.

Also, the case member may have a dome-shaped appearance.

According to this structure, the focus adjustment support device can also be applied to an image pickup apparatus including a case member having a dome-shaped appearance, for example, a dome-shaped surveillance camera.

According to another aspect of the invention, there is provided a focus adjusting method for adjusting a focus of a lens apparatus included in an image pickup system, the image pickup system comprising: an image pickup apparatus having the lens apparatus including an focus adjusting section requiring a manual adjustment; and a case member disposed at a given position for covering an image pickup range of the lens apparatus and the focus adjusting section, the case member including a portion corresponding to the image pickup range of the lens apparatus, the portion comprising a first light transmissible member having a given optical characteristic, wherein the focus adjusting method comprises: (a) preparing a focus adjustment support device including a second light transmissible member having an optical characteristic which, in a state where the focus adjustment support device is mounted on the lens apparatus, can provide substantially the same image forming position as in a state where the case member is disposed at the given position; (b), in a state where the case member is not disposed at the given position, mounting the focus adjustment support device onto the lens apparatus in such a manner that the focus of the lens apparatus can be manually adjusted using the focus adjusting section, and adjusting the focus of the lens apparatus manually using the focus adjusting section; and (c), in a state where the focus adjustment support device is removed from the lens apparatus and the case member is disposed at the given position, maintaining the focus of the lens apparatus manually adjusted using the focus adjusting section.

According to this focus adjusting method, firstly, there is prepared the focus adjustment support device including the second light transmissible member formed to have an optical characteristic which, in a state where the focus adjustment support device is mounted on the lens apparatus, can provide the same image forming position as in a state where the case member is disposed at the given position. Secondly, in a state where the case member is not disposed at the given position, the focus adjustment support device is mounted on the lens apparatus in such a manner that the focus of the lens apparatus can be manually adjusted using the focus adjusting section, and the focus of the lens apparatus is then adjusted manually using the focus adjusting section. Thirdly, in a state where the focus adjustment support device is removed from the lens apparatus and the case member is disposed at the given position, the focus of the lens apparatus adjusted using the focus adjusting section is maintained. Therefore, when once the focus adjustment support device is mounted on the lens apparatus, although the case member is not disposed, it is possible to provide the same optical condition as in a state where the case member is disposed at the given position. Further, since the focus adjusting section is not covered with the case member or focus adjustment support device, under this optical condition, the focus of the lens apparatus can be adjusted using the focus adjusting section which requires a manual adjustment. Thus, without raising a problem that provision of the case member at the given position causes the image forming position to vary to thereby complicate the focus adjusting operation excessively, the focus of the lens apparatus can be adjusted easily.

DETAILED DESCRIPTION OF THE INVENTION

Now, description will be given below in detail of a preferred embodiment according to the invention with reference to the accompanying drawings. In the present specification and drawings, the composing elements of the embodiment that have the same functional structures are given the same designations and thus the duplicate description thereof is omitted.

Figure 1:
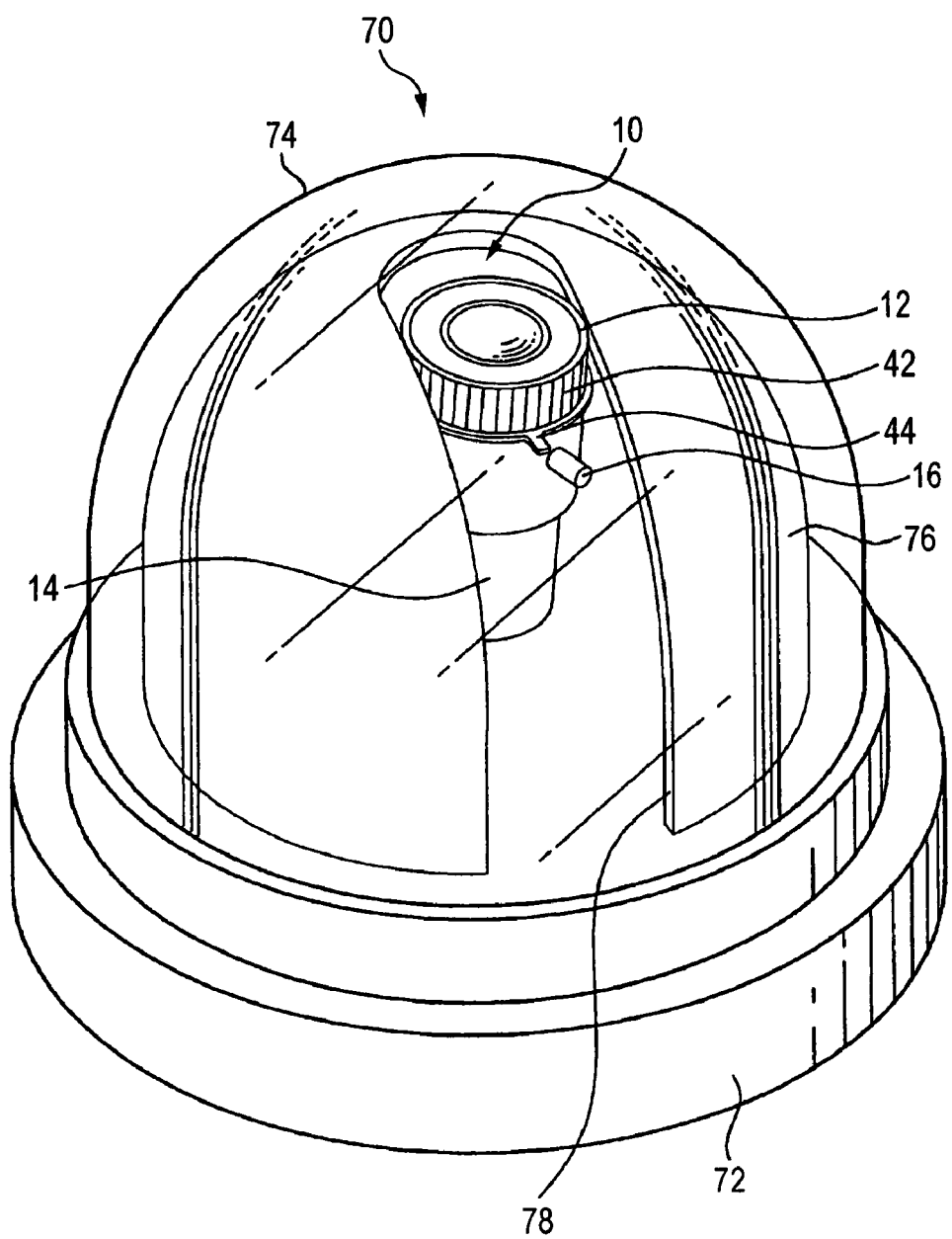
FIG. 1 is a perspective view of a surveillance camera to which a focus adjustment support device according to an embodiment of the invention is applied.
Figure 2:
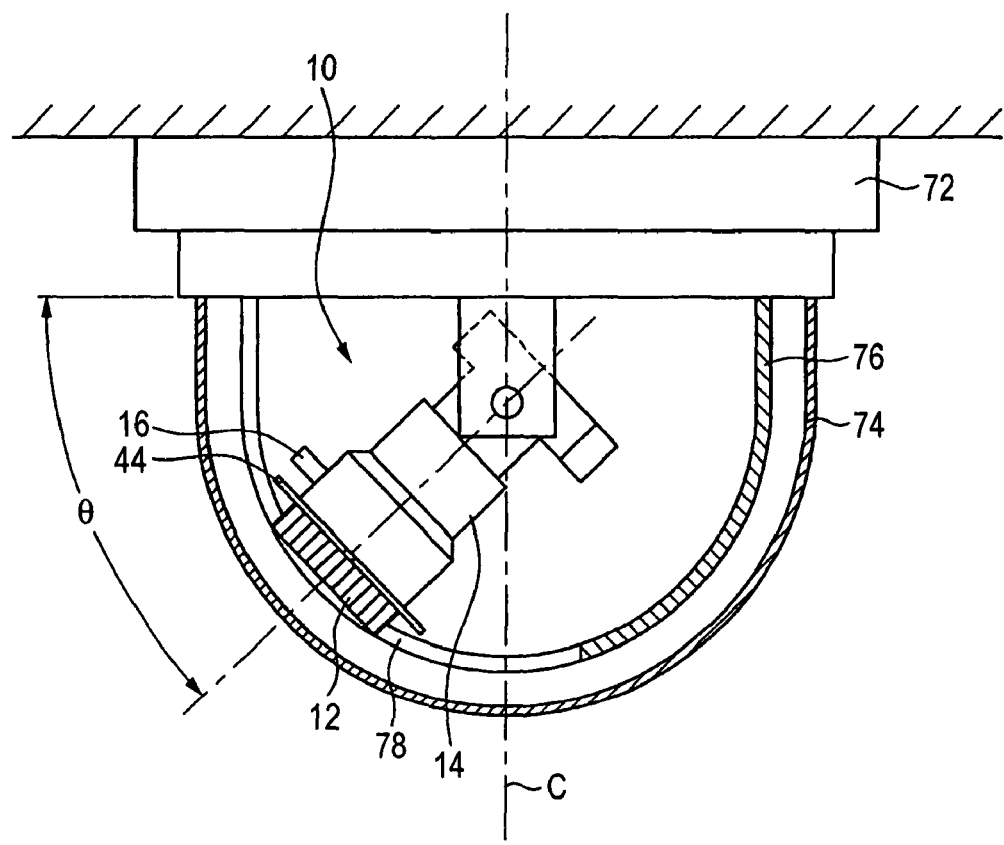
FIG. 2 is a section view of the surveillance camera shown in FIG. 1, showing a state in which it is installed on the ceiling.

FIG. 1 is a perspective view of a surveillance camera 70 to which a focus adjustment support device 100 according to an embodiment of the invention is applied. Also, FIG. 2 is a section view which shows a state where the surveillance camera 70 is installed on the ceiling. As shown in FIGS. 1 and 2, the surveillance camera 70 has a dome-shaped appearance and comprises a camera apparatus, while the camera apparatus includes a base member 72, a light transmissible case member 74 and a lens apparatus 10 to be mounted onto the base member 72 inside the case member 74. As shown in FIG. 2, the lens apparatus 10 can be mounted onto the base member 72 at an angle θ which can be varied (that is, the lens apparatus 10 can be rotated in a tilting manner). Also, the lens apparatus 10 can be mounted onto the base member 72 in such a manner that it can be rotated (it can be rotated in a panning manner) with respect to the base member 72 with the center line C as the rotation axis thereof.

As shown in FIGS. 1 and 2, within the case member 74, a cover member 76 can be mounted onto the lens apparatus 10.

The cover member 76 is used to cover up the lens apparatus 10. In the cover member 76, there is formed an opening 78 which corresponds to the tilting rotation range of the lens apparatus 10. The cover member 76 can be mounted in such a manner that it can be rotated together with the lens apparatus 10 with respect to the base member 72 with the center line C as the rotation axis thereof.

On the outer periphery of the lens apparatus 10, there are provided a focus ring 12 for adjusting the focus of (for focusing) the lens apparatus 10, and a zoom ring 14 for adjusting the focal distance of (for zooming) the lens apparatus 10. The focus ring 12 and zoom ring 14 are disposed so as to respectively correspond to the positions of focus lens (group) 26 and zoom lens (group) 32 respectively included in the lens apparatus 10, while the focus ring 12 and zoom ring 14 are positioned on the front side (on the object side) of the lens barrel of the lens apparatus 10 and on the rear side thereof, respectively.

Figure 3:
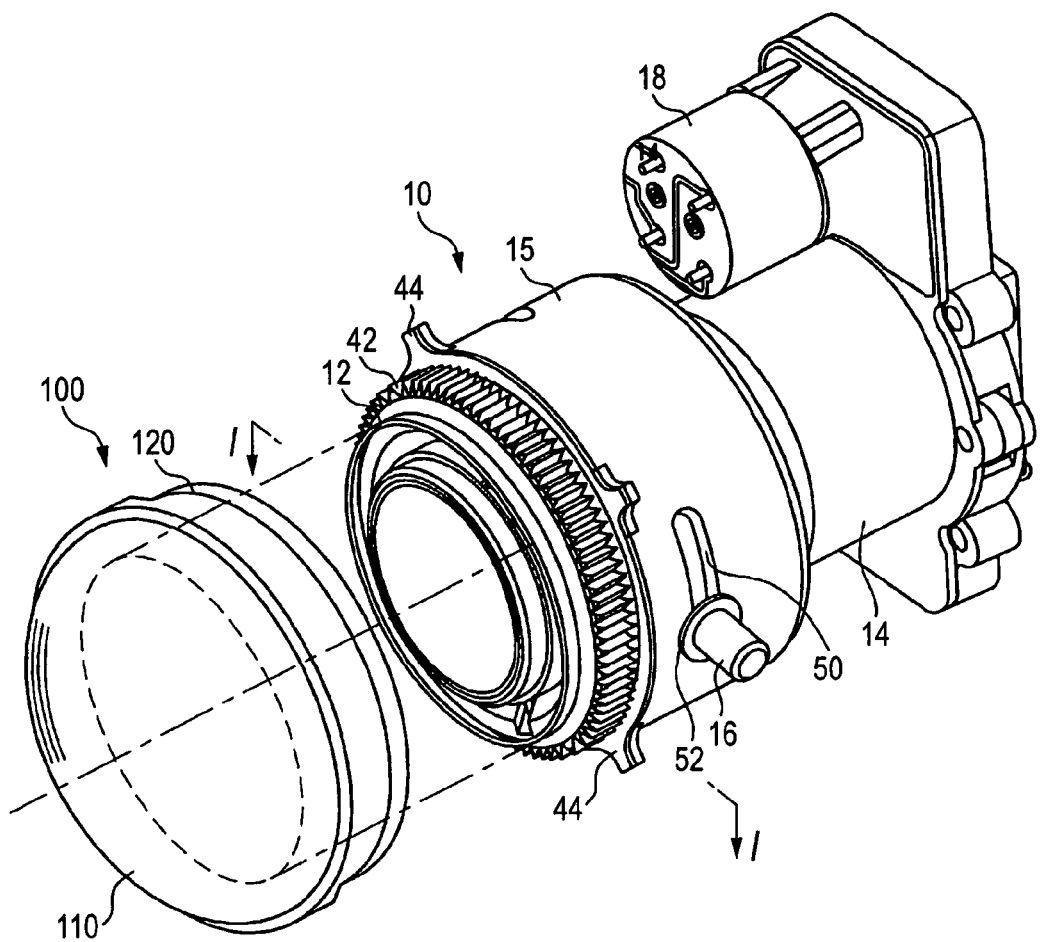
FIG. 3 is a perspective view of a lens apparatus onto which a focus adjustment support device according to an embodiment of the invention is mounted, and a structure attached to the lens apparatus.

FIG. 3 is a perspective view of the lens apparatus 10 on which the focus adjustment support device 100 according to the present embodiment is to be mounted and a structure attached to the lens apparatus 10. As shown in FIG. 3, the lens apparatus 10 includes a focus ring 12, a zoom ring 14 and a lock knob 16 on the outer periphery thereof. Also, on the lens apparatus 10, there is provided a drive device 18 which is used to drive an infrared filter (which will be discussed later). Further, onto the lens apparatus 10, there can be mounted the focus adjustment support device 100 which will be discussed later.

Figure 4:
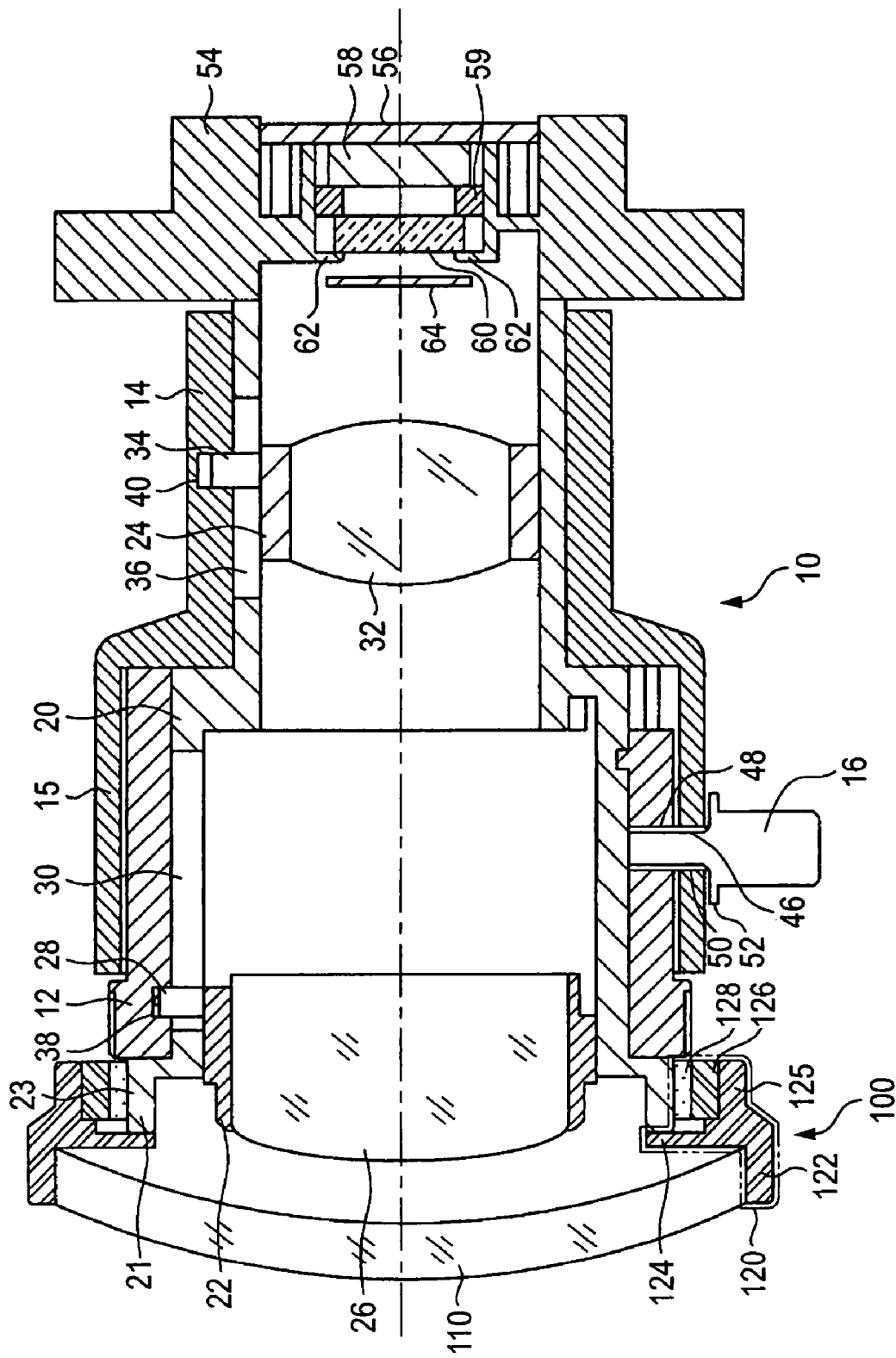
FIG. 4 is a section view of the lens apparatus shown in FIG. 3, showing the details of the structure thereof.

FIG. 4 is a section view of the lens apparatus 10 shown in FIG. 3, showing the details of the structure of the lens apparatus 10; and specifically, it is a section view taken along a surface including an optical axis and a one-dot chained line shown in FIG. 3. As shown in FIG. 4, the lens apparatus 10 includes a fixed barrel 20. Inside the fixed barrel 20, there are disposed lens frames 22 and 24. Also, the focus ring 12 and zoom ring 14 are disposed on the outer periphery of the fixed barrel 20.

The lens frame 22 is a frame which is positioned on the front side (on the object side) within the fixed barrel 20 and is used to hold the focus lens (group) 26. On the lens frame 22, there is mounted an engaging pin 28 which is projected out from the peripheral surface of the lens frame 22. On the other hand, in the fixed barrel 20, there is formed a straight groove 30 in the optical axis direction. When the engaging pin 28 is engaged with the straight groove 30, the lens frame 22 and focus lens 26 can be guided by the straight groove 30 and can be thereby moved straight in the optical axis direction.

The lens frame 24 is positioned backwardly of the lens frame 22 within the fixed barrel 20. The lens frame 24 is a frame which. is used to hold the zoom lens (group) 32. On the lens frame 24, there is mounted an engaging pin 34 which is projected out from the peripheral surface of the lens frame 24. On the other hand, in the fixed barrel 20, there is formed a straight groove 36 in the optical axis direction. When the engaging pin 34 is engaged with the straight groove 36, the lens frame 24 and zoom lens 32 can be guided by the straight groove 36 and can be thereby moved straight in the optical axis direction.

The focus ring 12 is disposed rotatably on the outer peripheral surface of the fixed barrel 20 at the position where the lens frame 22 is disposed. In the inner peripheral surface of the focus ring 12, there is formed a cam groove 38 in a spiral with respect to the optical axis. An engaging pin 28, which is mounted on the lens frame 22, can be engaged with the cam groove 38 of the focus ring 12. Therefore, when the focus ring 12 is operated and rotated, not only a crossing position between the cam groove 38 of the focus ring 12 and the straight groove 30 of the fixed barrel 20 is shifted in the optical axis direction but also, in compliance with the shifting motion of the crossing position, the engaging pin 28, lens frame 22 and focus lens 26 are shifted in the optical axis direction. In this manner, by operating and rotating the focus ring 12, the setting position of the focus lens 26 can be adjusted, thereby being able to adjust the focus of the lens apparatus 10.

The zoom ring 14 is disposed rotatably on the outer peripheral surface of the fixed barrel 20 backwardly of the focus ring 12. The zoom 14 has an extension portion 15 on the side of the focus ring 12. In the extension portion 15, the inside diameter of the zoom ring 14 is enlarged so as to be able to cover the outer periphery of the focus ring 12.

In the inner peripheral surface of the zoom ring 14, there is formed a cam groove 40 in a spiral with respect to the optical axis. The engaging pin 34 mounted on the lens frame 24 can be engaged with the cam groove 40 of the zoom ring 14. Therefore, when the zoom ring 14 is operated and rotated, not only a crossing position between the cam groove 40 of the zoom ring 14 and the straight groove 36 of the fixed barrel 20 is shifted in the optical axis direction but also, in compliance with the motion of the crossing position, the engaging pin 34, lens frame 24 and zoom lens 32 are shifted in the optical axis direction. In this manner, by operating and rotating the zoom ring 14, the setting position of the zoom lens 32 can be adjusted, thereby being able to adjust the focal distance (zoom angle of view) of the lens apparatus 10.

By the way, in the above-mentioned structure, the straight grooves 30 and 36 are formed in the fixed barrel 20 as well as the spiral-shaped cam grooves 38 and 40 are formed in the zoom ring 14. However, alternatively, a spiral-shaped groove may be formed in the fixed barrel 20 and a straight cam groove may be formed in the focus ring 12 or zoom ring 14. Also, spiral-shaped grooves may be formed in both of the fixed barrel 20 and focus ring 12 or zoom ring 14.

As shown in FIG. 3, on the outer periphery of the front end portion of the focus ring 12, there is provided an uneven portion 42; and, by rotating the uneven portion 42 manually, the focus ring 12 can be rotated. Also, on the outer periphery of the front end portion of the zoom ring 14, there are provided two or more pawls 44; and, by rotating these pawls 44 manually, the zoom ring 14 can be rotated.

The lock knob 16 is disposed in such a manner that it projects to the outer periphery of the extension portion 15 of the zoom ring 14. As shown in FIG. 4, in the optical-axis side outer periphery of the lock knob 16, there is formed a male screw 46 which can be engaged with a female screw 48 to be formed in the focus ring 12. In the zoom ring 14, there is formed an opening 50 having a width larger than the diameter of the male screw 46 of the lock knob 16. When the lock knob 16 is inserted into the opening 50 and thus the male screw 46 and female screw 48 are engaged with each other, the lock knob 16 can be fixed to the focus ring 12.

When the lock knob 16 is tightened, due to the engagement between the male screw 46 and female screw 48, the leading end of the lock knob 16 is contacted with the outer periphery of the fixed barrel 20. This fixes the rotation position of the focus ring 12. Also, when the lock knob 16 is tightened, a flange portion 52 formed in the lock knob 16 is contacted with the outer periphery of the extension portion 15 of the zoom ring 14, which can fix the rotation position of the zoom ring 14.

As shown in FIG. 4, on the rear end portion of the fixed barrel 20, there is mounted an image pickup device holder 54. On the image pickup device holder 54, there is mounted a base plate 56. On the base plate 56, there is mounted a CCD (image pickup device). On the front side of the CCD 58, there is disposed a seal rubber piece 56; and, on the further forwardly of the seal rubber piece 59, there is disposed a low-pass filter 60. The front portion of the low-pass filter 60 is contacted with the hold portion 62 of the image pickup device holder 54. Also, further forwardly of the low-pass filter 60, there is disposed an IR cut filter 64. The IR cut filter 64 includes a filter for cutting an infrared ray and a filter for transmitting an infrared ray therethrough. The two filters of the IR cut filter 64 can be switched over to each other by driving the drive device 18.

The case member 74, which contains the lens apparatus 10 therein, is disposed at a given position capable of covering at least the image pickup range of the lens apparatus 10 and the focus ring 12, and at least the portion of the case member 74 corresponding to the image pickup range of the lens apparatus 10 is made of a first light transmissible member which has a given optical characteristic. By the way, in FIGS. 1, 2 and 5, there is shown an example in which the first light transmissible member is applied to the whole of the case member 74. However, the first light transmissible member may also be applied only to a portion of the case member 74.

In the surveillance camera 70 to which the focus adjustment support device 100 according to the present embodiment is applied, when it is installed on the ceiling, wall surface or the like of a store, as shown in FIG. 4, the focus adjustment support device 100 is mounted on the lens apparatus 10. The focus adjustment support device 100 includes a second light transmissible member 110 as well as a mounting and holding section 120. The mounting and holding section 120 is used not only to hold the second light transmissible member 110 but also to mount the focus adjustment support device 100 onto the lens apparatus 10 without covering the focus ring 12 so that the focus adjustment of the lens apparatus 10 can be made manually using the focus ring 12. Here, the second light transmissible member 110 is formed so as to have an optical characteristic which, in a state where the focus adjustment support device 100 is mounted on the lens apparatus 10, is capable of obtaining the same image forming position as in a state where the case member 74 is disposed at a given position.

The focus adjustment support device 100 is mounted on the leading end of the lens apparatus 10, preferably, may be mounted on the leading end of the object side of the fixed barrel 20. For this purpose, on the leading end of the object side of the fixed barrel 20, there is formed a portion to be mounted on which the focus adjustment support device 100 can be mounted. The portion to be mounted, for example, as shown in FIG. 4, includes portions to be mounted 21 and 23 which are respectively formed so as to project out from the fixed barrel 20 toward the object.

The mounting and holding section 120 of the focus adjustment support device 100, for example, as shown in FIG. 4, includes a holding portion 122 for holding the second light transmissible member 110, a mounting portion for mounting the focus adjustment support device 100 onto the lens apparatus 10 in such a state that the focus adjustment of the lens apparatus 10 can be made manually using the focus ring 12, and an adjusting portion 126 for adjusting a clearance between the mounting portion and the portion to be mounted. Further, the mounting and holding portion 120 may also include a buffering portion 128 which, in a state where the focus adjustment support device 100 is mounted on the lens apparatus 10, is interposed between the adjusting portion 126 and the portion to be mounted 23 not only for generating a frictional force but also for preventing the lens apparatus 10 against damage.

The holding portion 122 holds at least a portion of the outer periphery of the second light transmissible member 110. The mounting portion includes mounting portions 124 and 125 which are mounted directly or indirectly on at least a portion of the portions to be mounted 21 and 23. The adjusting portion 126, in a state where the focus adjustment support device 100 is mounted on the lens apparatus 10, is interposed between the mounting portion 125 and the portion to be mounted 23; and, it may also be fixed to the portion to be mounted 23 through a buffering portion 128 which is formed inside the portion to be mounted 125.

According to the above-mentioned structure, when the focus adjustment support device 100 is mounted onto the lens apparatus 10, the mounting and holding section 120, in a state where the second light transmissible member 110 is held in the holding portion 122, mounts the mounting portions 124 and 125 of the focus adjustment support device 100 on the portions to be mounted 21 and 23 of the lens apparatus 10 respectively. Here, when the mounting portion 124 is contacted with the portion to be mounted 21, the focus adjustment support device 100 can be fixed in the optical axis direction of the lens apparatus 10; and, when the mounting portion 125 is contacted with the portion to be mounted 23 through the adjusting portion 126 and buffering portion 128, the focus adjustment support device 100 can be fixed on a plane crossing at right angles to the optical axis of the lens apparatus 10.

Here, the mounting and holding section 120 may also be structured such that the mounting portion thereof can be varied in shape according to the kinds of the lens apparatus 10 on which the focus adjustment support device 100 is to be mounted; and, according to this structure, the focus adjustment support device 100 can be mounted on the lens apparatus 10 which includes the portions to be mounted having different shapes. That is, for the lens apparatus respectively differing in outside diameter, for example, for the lens apparatus the portion to be mounted of which has a small diameter, by adjusting the inside diameter of the mounting portion of the mounting and holding section 120, the other remaining portions of the mounting and holding section 120 than the mounting portion thereof can be used in common, whereby there can be eliminated the need for preparation of focus adjustment support devices respectively designed specially for every different types of lens apparatus.

When the mounting and holding section 120 is structured such that the shape of the mounting portion thereof can be varied, there can be expected an example in which the thickness of the member for the adjusting portion 126 and/or buffering portion 128 is simply adjusted. In another example, the shape of the adjusting portion 126 and/or buffering portion 128 may be adjusted to thereby be able to dissolve a difference between the shape (for example, the cylindrical shape) of the mounting and holding section 126 including the mounting portion and the shape (for example, the prism shape) of the lens apparatus 10 including the portion to be mounted.

By the way, FIG. 4 simply shows just an example of the mounting and holding section. In other words, the structure of the mounting and holding section is not limited to the structure shown in FIG. 4 but various modified structures are also possible.

That is, the focus adjustment support device 100 may also be mounted through another member, instead of the fixed barrel 20, onto the lens apparatus 10. The portion to be mounted is not always needed to be composed of two portions to be mounted, but it may also be composed of one portion to be mounted or three or more portions to be mounted. Also, the positions and shapes of the respective portions to be mounted are not limited to the position and shape that are shown in FIG. 4. The mounting portion and holding portion may not be formed as an integrated portion but may be formed separately. Further, the mounting portion, holding portion, adjusting portion and buffering portion may also be formed individually, or they may be formed as an integrated portion wholly or partially.

Also, in FIGS. 3 to 5, there is shown an example in which the mounting and holding section is wholly structured in a cylindrical shape. However, the mounting and holding section may also be structured, instead of the cylindrical shape, in a prism shape, in a slit shape, in a cantilevered beam shape, or in other shapes.

Of course, it can be understood that all modifications including the above-mentioned modified structures fall under the technical scope of the invention. That is, to the mounting and holding portion, there can be applied any structure provided that it is capable of mounting the focus adjustment support device 100 onto the lens apparatus 10 while the focus adjustment support device 100 is fixed in the optical axis direction of the lens apparatus 10 as well as on a plane crossing at right angles to the optical axis.

The second light transmissible member 110 of the focus adjustment support device 100, in order to have a given optical characteristic, as shown in FIG. 4, has not only a given thickness and a given radius of curvature but also a surface corresponding to at least the image pickup range of the lens apparatus 10. Here, the second light transmissible member 110 is made of material having a given index of refraction, for example, plastic material such as acryl. Also, the focus adjustment support device 100 is mounted onto the lens apparatus 10 in a state where it holds the second light transmissible member 110; and, in a state where a given clearance is secured between the focus lens 26 and the focus adjustment support device 100, the second light transmissible member 110 is disposed on the object side of the focus lens 26.

The second light transmissible member 110 is formed to have an optical characteristic which, in a state where the focus adjustment support device 100 is mounted on the lens apparatus 10, can obtain the same image forming position as in a state where the case member 74 is mounted on, for example, the surveillance camera 70. Therefore, when forming the second light transmissible member 110, by adjusting the optical characteristic of the material for forming the second light transmissible member 110, specifically, by adjusting at least one of the characteristic values of the second light transmissible member 110 including the material thickness, radius of curvature, index of refraction, position with respect to the focus lens 26 and the like thereof as a variable amount, there can be obtained a prescribed second light transmissible member 110.

Here, FIG. 4 shows just an example of the second light transmissible member. That is, the second light transmissible member according to the invention is not limited to the structure shown in FIG. 4 but various modified structures are also possible.

Figure 5A:
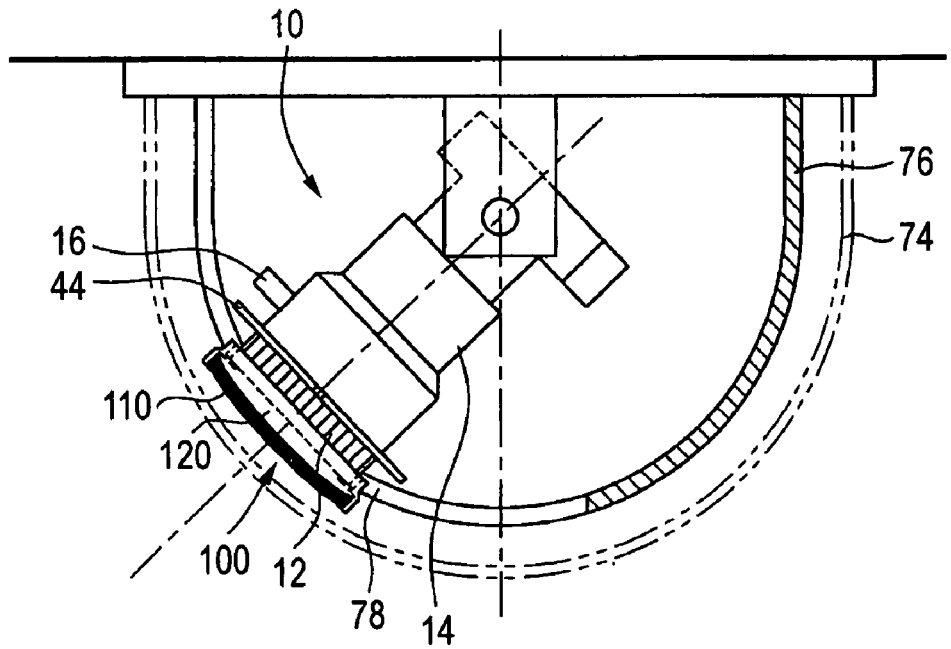
FIG. 5A is a section view of a focus adjustment support device according to an embodiment of the invention.
Figure 5B:
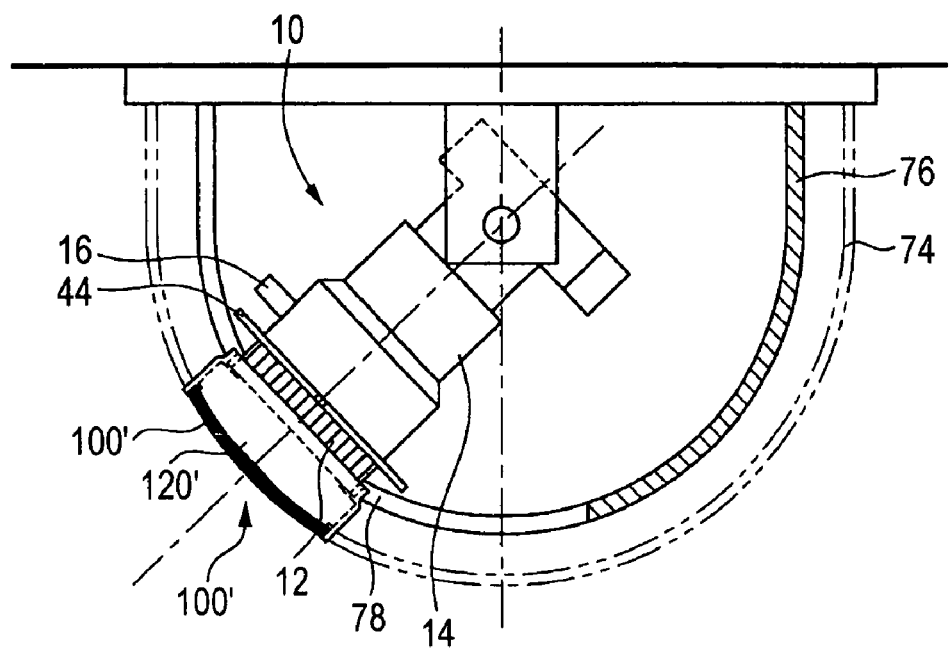
FIG. 5B is a section view of a focus adjustment support device according to a modification of the embodiment.

FIG. 5 is a section view of the focus adjustment support device 100 according to the present embodiment (FIG. 5A) and its modification 100' (FIG. 5B). According to the modification shown in FIG. 5B, a second light transmissible member 110' has the same index of refraction and thickness as the first light transmissible member of the case member 74 and is formed as a portion of a surface constituted by the case member 74 while the case member 74 is mounted on the surveillance camera 70. That is, in a state where the case member 74 is mounted on the surveillance camera 70, a portion of the case member 74 is cut out as a surface corresponding to at least the image pickup range of the lens apparatus 10 and is used as the second light transmissible member 110'.

According to the present modification, since the second light transmissible member 110' of the focus adjustment support device 100' is formed as a portion of a surface constituted by the case member 74 while it is mounted on the surveillance camera 70, there is almost no need for the above-mentioned adjustment of the characteristic value. Thus, the focus adjustment support device 100' according to the present modification, in a state where it is mounted on the lens apparatus 10, has an optical characteristic which can obtain the same image forming position as in a state where the case member 74 is mounted on the surveillance camera 70.

Also, in FIGS. 3 to 5, there are shown examples in which the second light transmissible members 110 and 110' are structured in a disk shape as a whole. However, the second light transmission member may also be structured in other shapes than the disk shape.

Of course, it can be understood that all modifications including the above-mentioned modification fall under the technical scope of the invention. That is, to the second light transmissible member, there can be applied any shape, provided that, in a state where the focus adjustment support device 100' is mounted on the lens apparatus 10 using the mounting and holding section, it has an optical characteristic capable of providing the same image forming position as in a state where the case member 74 is disposed at a given position.

As has been described heretofore, according to the present embodiment, there is provided the focus adjustment support device 100 to be mounted onto the lens apparatus 10 of the surveillance camera 70 for supporting the focus adjustment of the lens apparatus, wherein the surveillance camera comprises: the camera apparatus having the lens apparatus 10 including the focus ring 12 requiring a manual adjustment; and, the case member 74 disposed at a given position for covering at least the image pickup range of the lens apparatus 10 and the focus ring 12, while a portion of the case member 74 corresponding to the image pickup range is formed of a first light transmissible member having a given optical characteristic.

The present focus adjustment support device 100 comprises: a second light transmissible member 110; and, a mounting and holding section 120 for holding the second light transmissible member 110 and also for mounting the focus adjustment support device 100 onto a lens apparatus 10 without covering a focus ring 12 so that the focus of the lens apparatus 10 can be manually adjusted using the focus ring 12. Here, the second light transmissible member 110 is formed to have an optical characteristic which, in a state where the focus adjustment support device 100 is mounted on the lens apparatus 10, can provide the same image forming position as in a state where a case member 74 is disposed at a given position.

According to this structure, the second light transmissible member 110 is formed to have an optical characteristic which, in a state where the focus adjustment support device 100 is mounted on the lens apparatus 10, can provide the same image forming position as in a state where the case member 74 is disposed at a given position. Also, the focus adjustment support device 100 is mounted onto the lens apparatus 10 using the built-in mounting and holding section 120 in a state where the focus of the lens apparatus 10 can be manually adjusted using the focus ring 12.

Thanks to this, when once the focus adjustment support device 100 is mounted onto the lens apparatus 10, although the case member 74 is not disposed, there can be formed the same optical condition as in a case where the case member 74 is disposed at a given position. Also, since the focus ring 12 is not covered with the case member 74 or focus adjustment support device 100, under the present optical condition, the focus of the lens apparatus 10 can be adjusted using the focus ring 12 that requires a manual adjustment. Therefore, without raising a problem that provision of the case member 74 at a given position causes the image forming position to vary to thereby complicate the focus adjustment of the lens apparatus 10 excessively, the focus adjustment of the lens apparatus 10 can be made easily.

Next, description will be given below in detail of a focus adjusting method according the present embodiment. The focus adjusting method according to the present embodiment aims at adjusting the focus of a lens apparatus 10 mounted in a surveillance camera 70 which comprises: a camera apparatus incorporating the lens apparatus 10 including a focus ring 12 requiring a manual adjustment; and, a case member 74 disposed at a given position for covering at least the image pickup range of the lens apparatus 10 and focus ring 12, while a portion of the case member 74 corresponding to the image pickup range of the lens apparatus is formed of a first light transmissible member having a given optical characteristic.

When installing the surveillance camera 70, in a state where the camera apparatus incorporating the lens apparatus 10 to be mounted on a base member 72 is mounted on the ceiling, wall surface or the like of a store, the optical axis of the lens apparatus 10 is set in a given direction in the horizontal and/or vertical direction.

In a focus adjusting method according to the present embodiment, firstly, there is prepared the focus adjustment support device 100 which can be applied to the surveillance camera 70 to the installed. The focus adjustment support device 100 includes a second light transmissible member 110 formed to have an optical characteristic which, in a state where the focus adjustment support device 100 is mounted on the lens apparatus 10, can provide the same image forming position as in a state where the case member 74 is disposed at a given position, for example, in a state where the case member 74 is mounted on the surveillance camera 70.

Next, in a state where the case member 74 is not mounted on the surveillance camera 70, the focus adjustment support device 100 is mounted onto the lens apparatus 10 using a built-in mounting and holding section 120 in such a manner that the focus of the lens apparatus 10 can be adjusted using the focus ring 12. That is, the focus adjustment support device 100 is mounted onto the lens apparatus 10 in such a manner that not only it is fixed in the optical axis direction of the lens apparatus 10 and on a plane crossing at right angles to the optical axis of the lens apparatus 10 but also it does not cover the focus ring 12. And, in a state where the focus adjustment support device 100 is mounted on the lens apparatus 10, the focus of the lens apparatus 10 is manually adjusted using the focus ring 12.

When once the focus adjustment support device 100 is mounted on the lens apparatus 10, although the case member 74 is not mounted on the surveillance camera 70, it is possible to provide the same optical condition as in a state where the case member 74 is mounted on the surveillance camera 70. Further, since the focus ring 12 is not covered with the case member 74 or focus adjustment support device 100, under the present optical condition, the focus of the lens apparatus 10 can be adjusted using the focus ring 12 that requires a manual adjustment.

Next, the focus of the lens apparatus 10 is manually adjusted using the focus ring 12. When the focus adjustment is made to a sufficient degree, the focus adjustment support device 100 is removed from the lens apparatus 10 and the case member 74 is mounted onto the surveillance camera 70, completing the installation of the surveillance camera 70.

When the focus adjustment support device 100 is removed from the lens apparatus 10 and the case member 74 is mounted onto the surveillance camera 70, the optical path length of an object light incident to the lens apparatus 10 is varied because the case member 74 has a given index of refraction. However, in a state where the focus adjustment support device 100 is mounted on the lens apparatus 10, the focus adjustment of the lens apparatus 10 is made using the focus ring 12 under the same optical condition as in a state where the case member 74 is mounted.

Therefore, even in a state where the focus adjustment support device 100 is removed from the lens apparatus 10 and the case member 74 is mounted on the surveillance camera 70, the focus of the lens apparatus 10 adjusted using the focus ring 12 can be maintained. Thus, without raising a problem that mounting of the case member 74 causes the image forming position to vary to thereby complicate the focus adjustment of the lens apparatus 10 excessively, the focus adjustment of the lens apparatus 10 can be made easily.

Although description has been given heretofore of the preferred embodiment of the invention with reference to the accompanying drawings, of course, the present invention is not limited to such embodiment. It is obvious to a person skilled in the art that various changes and modifications are also possible without departing from the scope of the appended claims, and it can be understood easily that such changes and modifications also fall under the technical scope of the invention.

For example, in the above description, there is shown an embodiment in which the invention is applied to the dome-shaped surveillance camera 70; however, the application of the invention is not limited only to such embodiment. That is, the invention can also apply similarly to, for example, a case in which an image pickup apparatus including a lens apparatus not limited to the use of surveillance is covered with a dustproof cover or the like and, in a state where the dustproof cover or the like is mounted, the focus adjustment of the lens apparatus using an adjusting section requiring a manual adjustment is difficult to make.

Also, the present invention can also apply similarly to, for example, a case where the holding portion holding the second light transmissible member is fastened to the portion to be mounted through a mounting portion (a mounting member) made of a fastening member such as a screw. In this case, the focus adjustment support device can be mounted onto the lens apparatus only through partial contact between the mounting portion (mounting member) and the portion to be mounted.

Further, the present invention can also apply similarly to, for example, a case where the mounting and holding portion of the focus adjustment support device is formed on the lens apparatus side integrally with the focus adjustment support device and, when adjusting the focus of the lens apparatus, only the second light transmissible member is mounted onto and removed from the lens apparatus.

According to the invention, there can be provided a focus adjustment support device and a focus adjusting method which are capable of adjusting the focus of the lens apparatus easily.

The entire disclosure of each and every foreign patent application from which the benefit of foreign priority has been claimed in the present application is incorporated herein by reference, as if fully set forth.

What is claimed is:

1. A focus adjustment support device to be mounted onto a lens apparatus included in an image pickup system for supporting focus adjustment of the lens apparatus, the image pickup system comprising:
- an image pickup apparatus having the lens apparatus including an focus adjusting section requiring a manual adjustment; and
- a case member disposed at a given position for covering an image pickup range of the lens apparatus and the focus adjusting section, the case member including a portion corresponding to the image pickup range of the lens apparatus, the portion comprising a first light transmissible member having a given optical characteristic that provides an image forming position for the manual focus adjustment, wherein the focus adjustment support device comprises:
a second light transmissible member; and
a mounting and holding section that holds the second light transmissible member and that mounts the focus adjustment support device onto the lens apparatus in such a manner that a focus of the lens apparatus can be manually adjusted using the focus adjusting section, wherein the second light transmissible member is formed to have an optical characteristic which, in a state where the focus adjustment support device is mounted on the lens apparatus, can provide substantially the same image forming position as in a state where the case member is disposed at the given position, so as to maintain focus adjustment upon removal of the second light transmitting member and repositioning of the case member.

2. A focus adjustment support device as set forth in claim 1, wherein the second light transmissible member has substantially the same index of refraction and thickness as the first light transmissible member and is formed as a portion of a surface constituted by the case member when it is disposed at the given position.

3. A focus adjustment support device as set forth in claim 1, wherein the mounting and holding section is formed such that a shape of the mounting portion can be changed according to a shape of a portion to be mounted formed in the lens apparatus.

4. A focus adjustment support device as set forth in claim 1, wherein the case member has a dome-shaped appearance.

5. A focus adjusting method for adjusting a focus of a lens apparatus included in an image pickup system, the image pickup system comprising:
- an image pickup apparatus having the lens apparatus including an focus adjusting section requiring a manual adjustment; and
- a case member disposed at a given position for covering an image pickup range of the lens apparatus and the focus adjusting section, the case member including a portion corresponding to the image pickup range of the lens apparatus, the portion comprising a first light transmissible member having a given optical characteristic, wherein the focus adjusting method comprises:
(a) preparing a focus adjustment support device including a second light transmissible member having an optical characteristic which, in a state where the focus adjustment support device is mounted on the lens apparatus, can provide substantially the same image forming position as in a state where the case member is disposed at the given position;

(b), in a state where the case member is not disposed at the given position, mounting the focus adjustment support device onto the lens apparatus in such a manner that the focus of the lens apparatus can be manually adjusted using the focus adjusting section, and adjusting the focus of the lens apparatus manually using the focus adjusting section; and (c), in a state where the focus adjustment support device is removed from the lens apparatus and the case member is disposed at the given position, maintaining the focus of the lens apparatus manually adjusted using the focus adjusting section.

* * * * *